United States Patent [19]
Hewett

[11] Patent Number: 5,198,939
[45] Date of Patent: Mar. 30, 1993

[54] APPARATUS FOR POSITIONING APERTURES OF A DISK ASSEMBLY

[75] Inventor: Arthur Hewett, Berkeley Heights, N.J.

[73] Assignee: Altman Stage Lighting Co., Inc., Yonkers, N.Y.

[21] Appl. No.: 795,537

[22] Filed: Nov. 21, 1991

[51] Int. Cl.$^5$ .............................................. G02B 5/22
[52] U.S. Cl. .................................. 359/889; 359/233; 250/233
[58] Field of Search ............... 359/889, 894, 233, 234, 359/235, 236; 250/232, 233; 180/233

[56] References Cited

U.S. PATENT DOCUMENTS

| | | | |
|---|---|---|---|
| 3,333,505 | 8/1967 | Unuma | 359/889 |
| 3,654,480 | 4/1972 | Stephenson | 250/233 |
| 3,883,243 | 5/1975 | Weisglass et al. | 359/889 |

Primary Examiner—Loha Ben
Attorney, Agent, or Firm—Lackenbach, Siegel, Marzullo and Aronson

[57] ABSTRACT

Apparatus for positioning apertures in a beam of light including a plurality of drive members coaxially supported on a longitudinally extending shaft, each having a separate electrically operable drive motor mechanically interlocked therewith.

15 Claims, 7 Drawing Sheets

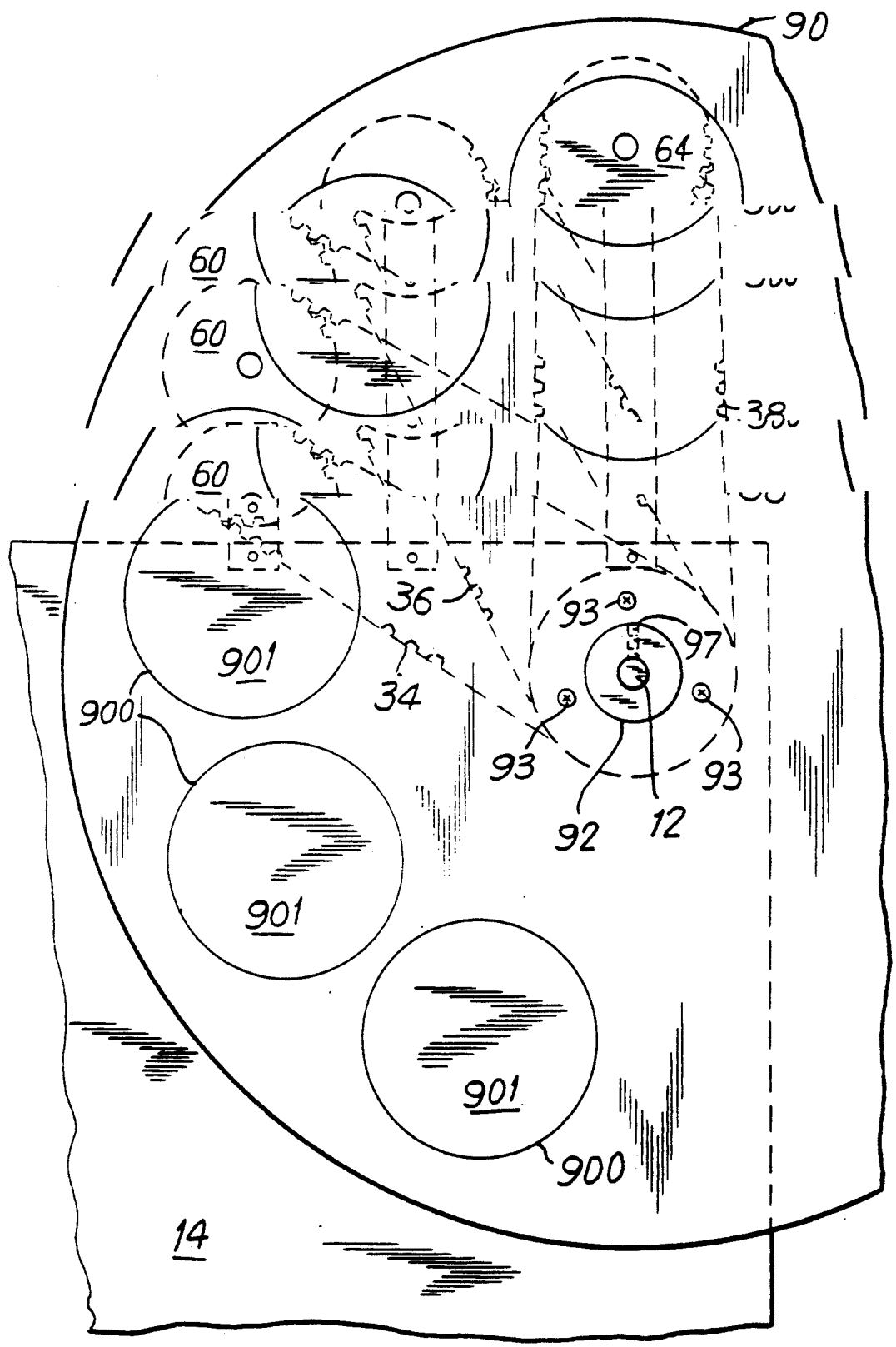
FIG. I(A)

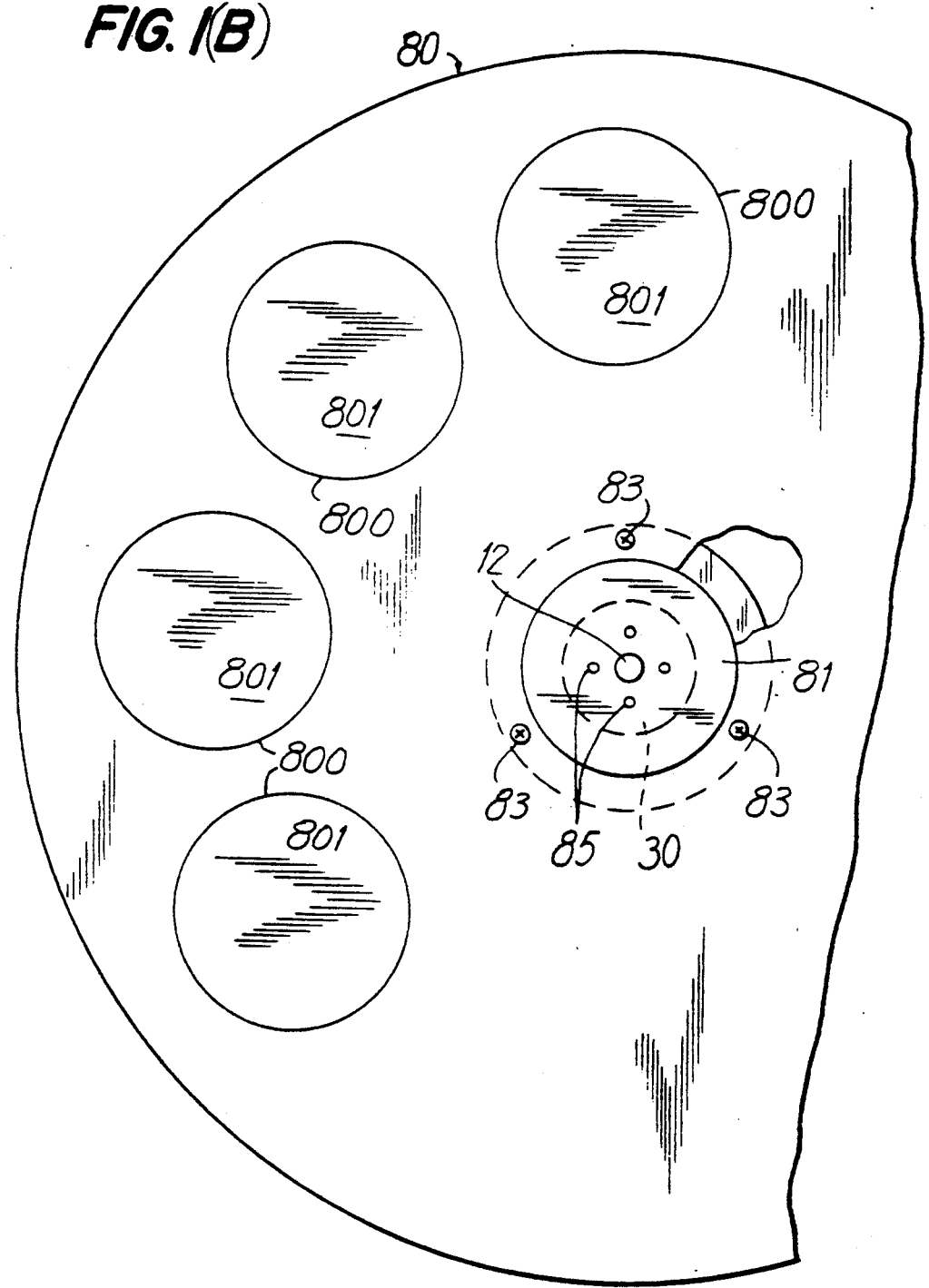

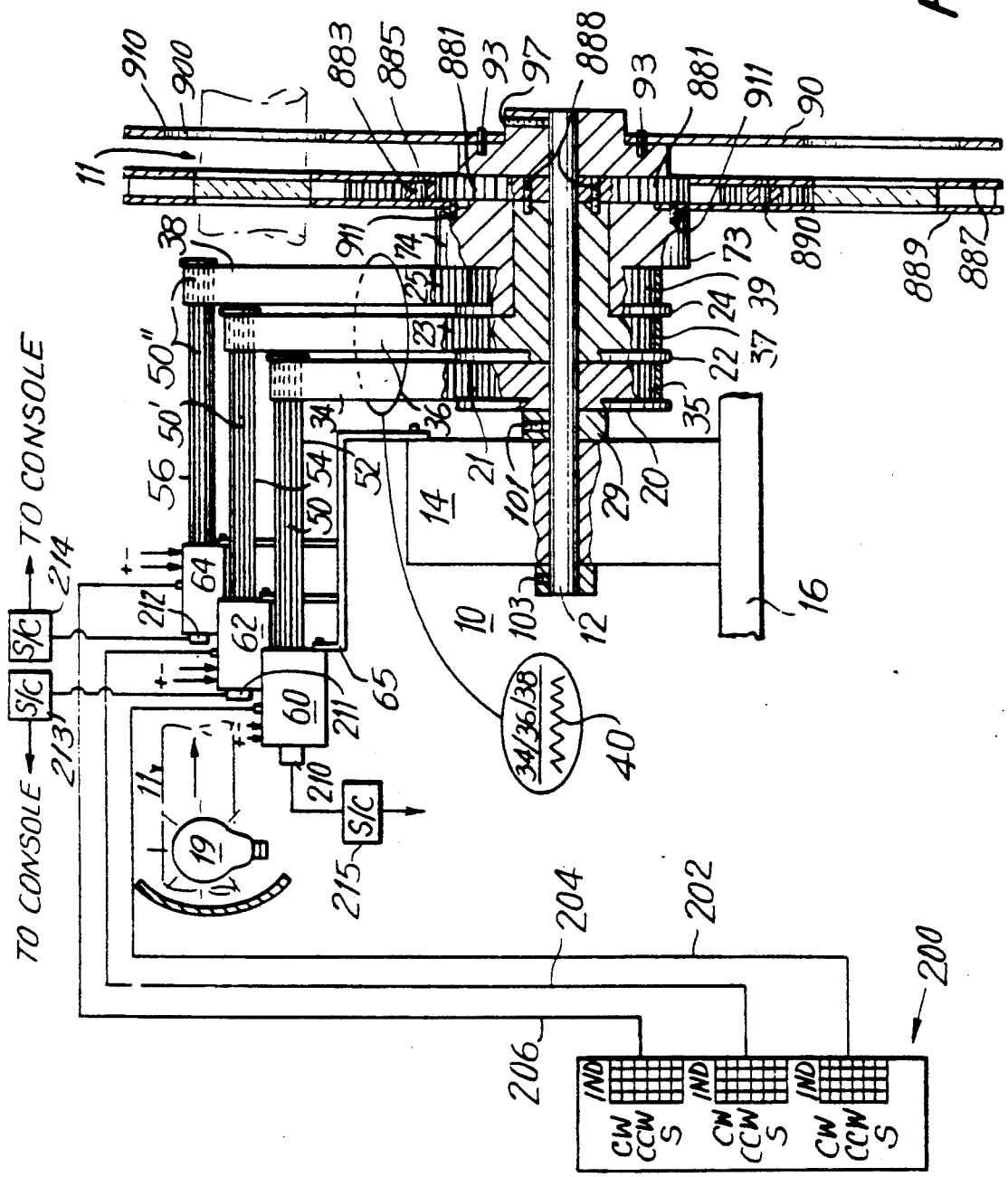

APPARATUS FOR POSITIONING APERTURES OF A DISK ASSEMBLY

The present invention relates to an aperture positioning apparatus for theatrical and display lighting systems and, more particularly, to a simplified and light weight as well as compact apparatus for concurrently positioning a plurality of apertures in a light beam.

Various aperture positioning apparatuses are known to the art, but many are complicated and bulky as well as strucurally heavy due to their complexity. In addition, other such apparatus, such as that disclosed in U.S. Pat. No. 4,896,738 to Richardson, et al have other disadvantages due to being roller supported and having roller friction driven aperture frames on opposite sides of a base panel. The roller driven and supported apparatus of Richardson, et al. enables aperture selection, but is subject to slippage during rapid starts and stops which can lead to random aperture misalignment which can also occur due to mechanical impact shock and vibration.

SUMMARY OF THE INVENTION

The apparatus of the present invention is a device for positioning apertures in a light beam and comprises a longitudinally extending shaft supported by and extending from a base member. A plurality of separate disk assembly mounting means having concentric, mechanically interlockable outer rims for respective engagement with separate drive means are placed over the free-end of the shaft and arranged surrounding the longitudinally extending shaft and supportably mounted thereon, but are, unless otherwise affixed thereto, independently rotatable about the longitudinally extending shaft. Separate electrically operable drive means are respectively interlockingly engaged with a plurality of the outer rims of the mounting means and the electrically operable drive means are actuated to synchronously and independently rotate each of the mounting means, CCW or CW, intermittently or continuously, and to dynamically and synchronously hold the mounting means in a fixed stationary position when not being moved. A plurality of adjacent disk assemblies each having media-containing apertures, e.g. color filters, patterns ("gobos") and the like are respectively affixed to a plurality of the mounting means in respective planes transverse to the light beam and apertures are positioned to intercept the light beam by actuation of the electrically o drive means.

BRIEF DESCRIPTION OF THE DRAWINGS

FIGS. 1 (A)–1(C) are front elevation views of components of the apparatus of FIG. 1;

FIG. 6 shows an elevation view of a further embodiment of the present invention.

DETAILED DESCRIPTION OF THE PREFERRED EMBODIMENT

Figure 1:
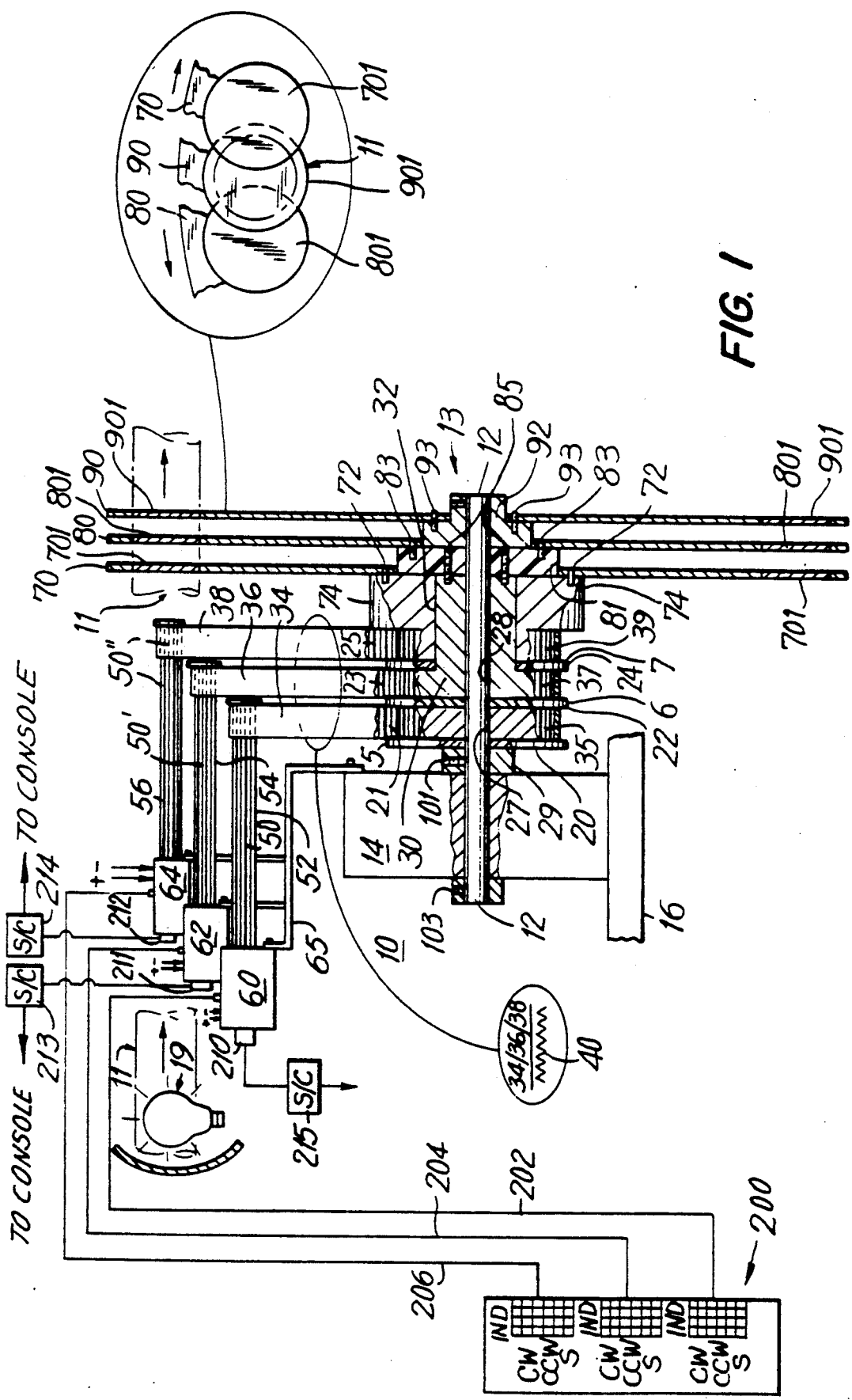
FIGS. 1 and 1(continued are elevation views, partly in sections, of an embodiment of the present invention.
Figure 1C:
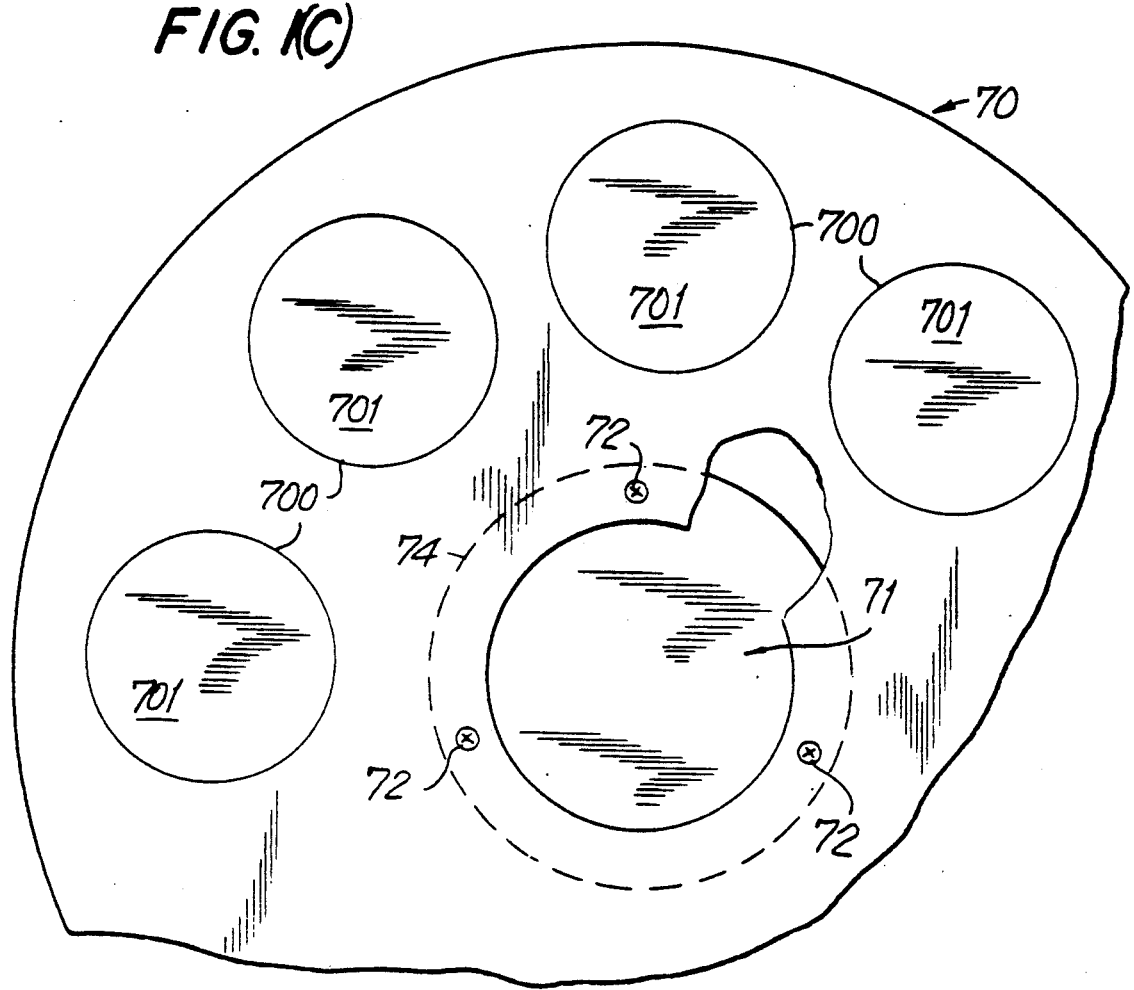
FIG. 1(D) is a partial side elevation view of the components of FIG. 1(A)
Figure 1D:
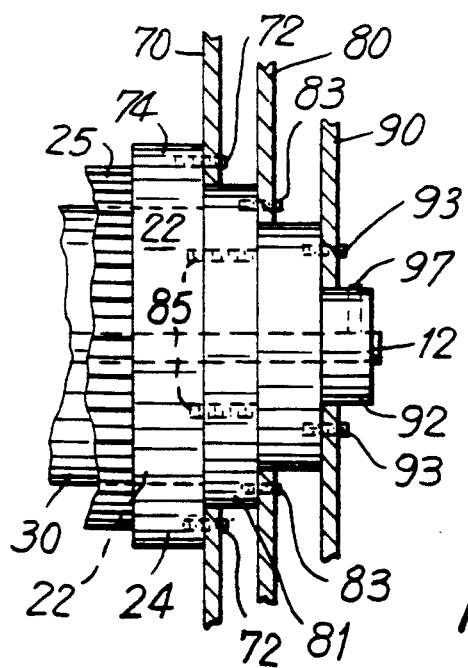
Figure 2:
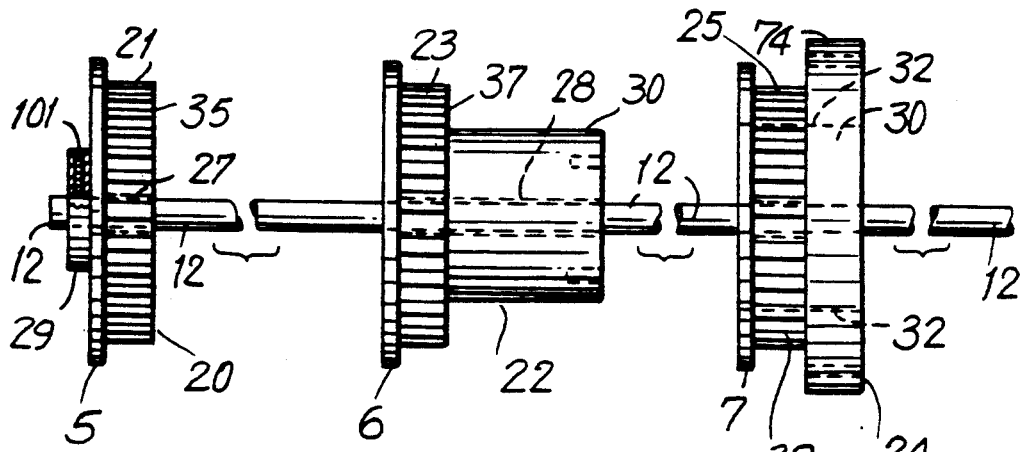
FIG. 2 is an exploded side elevation view of the driving means elements of the apparatus of FIG 1.
Figure 3A:
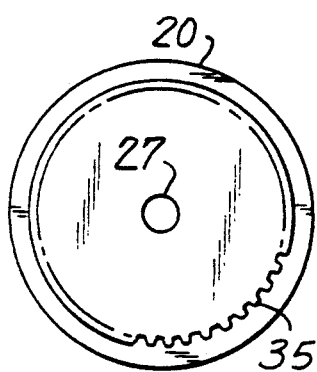
FIGS. 3(A) and 3(B), 4(A) and 4(B), and 5(A) and 5(B) show front and rear views of the elements of FIG. 2.
Figure 4A:
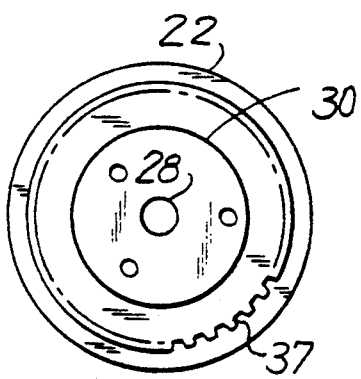
Figure 5A:
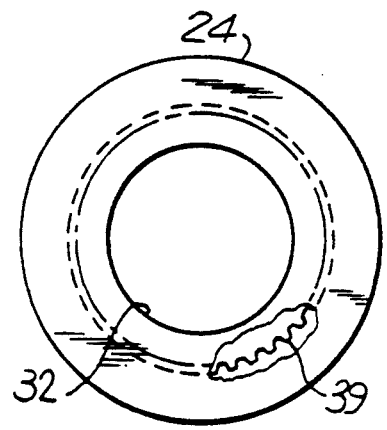
Figure 3B:
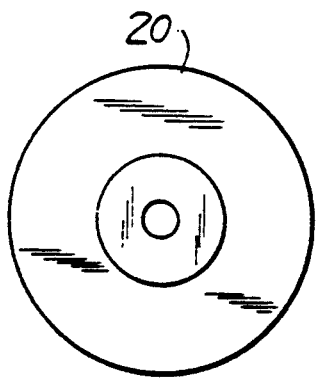
Figure 4B:
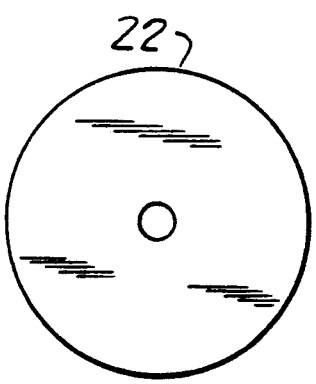
Figure 5B:
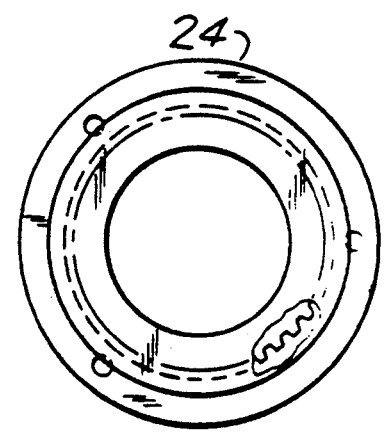

With reference to the drawings, the aperture positioning device of the present invention is indicated at 10 in FIG. 1 for positioning apertures to intercept light beam 11 from a conventional light source 19 and includes a longitudinally extending shaft 12 which is supported by and extends from base 14 which is mounted on a suitable substrate 16. A plurality of drive means 20, 22, 24 are slipped over the free-end 13 of longitudinally extending shaft 12 in a slide-fit with shaft 12, and with each other, and positioned closely adjacent. Rear driving means 20 fits directly on shaft 12 by way of its central bore 27 and intermediate drive means 22 fits directly on shaft 12 by way of its central bore 28 as shown in FIG. 2. The forward driving means 24 has an axial bore 32 which fits over the cylindrical longitudinal extension 30 of intermediate drive means 22 in a slide-fit, by way of its central axial bore 32, also as shown in FIG. 2.

Outer rims 21, 23, 25 of drive means 20, 22, 24 with flange guides 5, 6, 7 are placed closely, longitudinally adjacent on shaft 12 and the outer rims 21, 23, 25, are provided with a mechanically interlockable peripheral surface, e.g., parallel, longitudinal gear teeth 35, 37, 39.

Separate endless, belts 34, 36, 38 are interlockably mechanically engaged to the outer rims 21, 23, 25 by means of integral teeth 40, 40'40" which respectively engage gear teeth 35, 37, 39 of drive members 20, 22, 24 and the gear teeth 50, 50', 50" of driver shafts 52, 54, 56. The driver shafts 52, 54, 56 are independently and separately rotated by electrically operable motors 60, 62, 64 which are suitably d.c. servo motors or stepper motors mounted on bracket 65 which is affixed to base 14. An apertured rearward disk assembly 70 with a central opening 71 is affixed to forward driver means 24 by means of set screws 72 to the forward annular flange portion 74 of drive member 24. Intermediate apertured disk 80 is mounted to a spacer element 81 by screws 83 and spacer element 81 is fixed to the cylindrical axial extension 30 of drive means 22 by screws 85. Forward apertured disk 90 is mounted on a flanged hub 92 and affixed thereto by screws 93. Set screw 97 fixes flanged hub 92, and hence apertured disk 90, to shaft 12. Shaft 12 is fixed to rearward drive member 20 by set screw 101 which engages flange 29 of drive means 20 and shaft 12 is secured to base member 14 by screw clamp 103.

In operation, console 200 separately provides electrical signals to electrically operable motors 60, 62, 64 over lines 202, 204, 206 to rotate the motors CCW, CW, intermittently or continuously as desired, and counting means such as tachometers 210, 211, 212 provide signals to the console to identify the precise position of apertures 700, 800, 900 of disk assemblies 70, 80, 90, since the mechanically interlockable tooth and gear engagement of belts 34, 36, 38 with shafts 52, 54, 56 and outer rims 21, 23, 25 move synchronously and eliminate any possibility of slippage due to sudden starts, stops or mechanical impact. When the apertured disk assemblies are positioned as desired, (which may contain color filters, cut-out patterns ("gobos") 701, 801, 901,) the respective motors are dynamically held in a fixed position by the operation of conventional servo controllers 215, 213, 214, which detect the appropriate "null" voltage condition from tachometers 210, 211, 212. Consequently, jolting movements will not cause misalignment of the desired aperture positions. The apparatus of the present invention has the advantage that it is compact, with the driver motors and linkage all within the "shadow" of the disk assemblies as shown in FIG. 1(A). Also, the disk assemblies can be readily removed and replaced at the free-end 13 of shaft 12 and the axial slide-fit mounting provides increased stability.

Figure 7A:
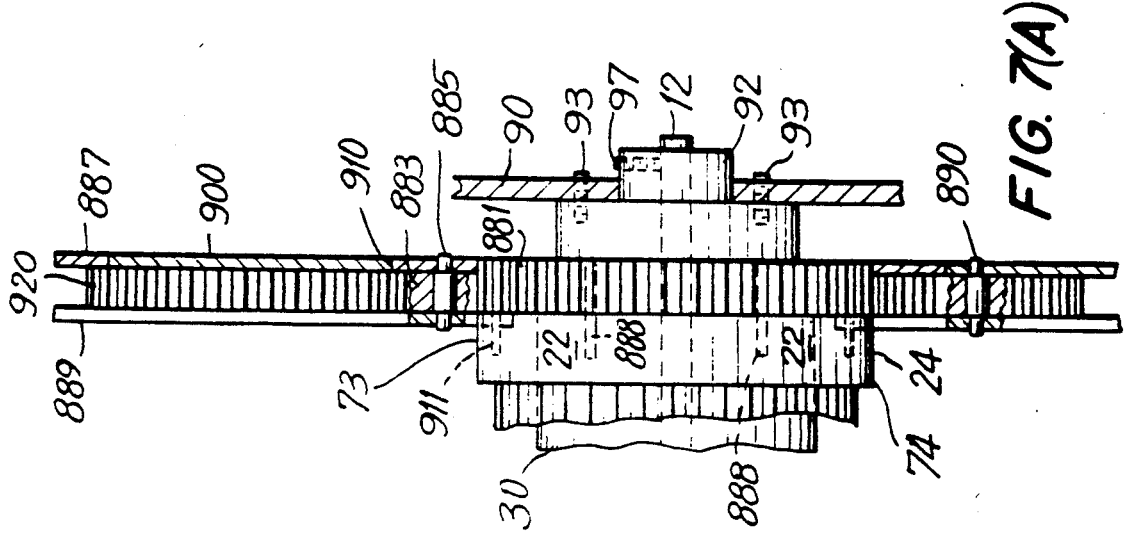
FIGS. 7 and 7(A) show a front and side view of a component of FIG. 6.
Figure 7:
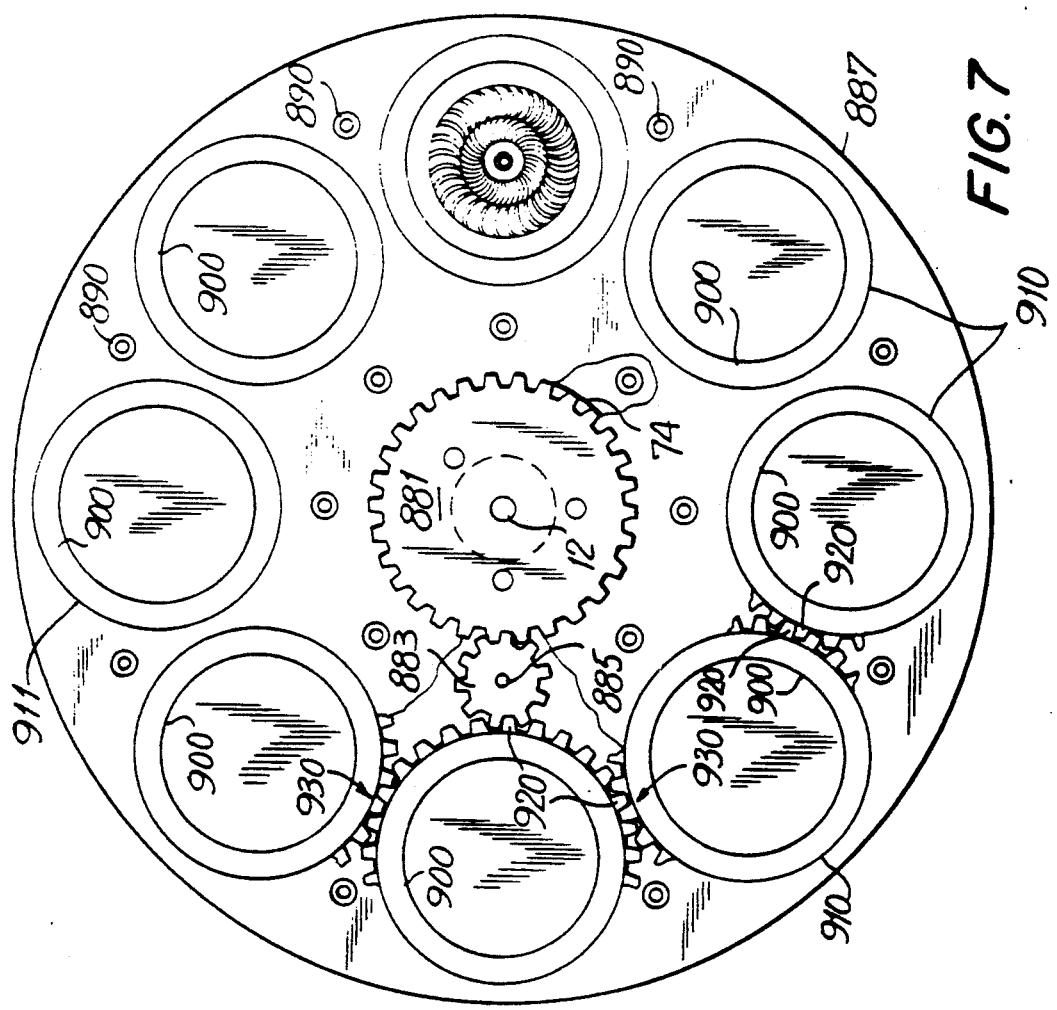

In a further embodiment of the present invention with reference to FIGS. 6, 7 and 7(A), spacer element 81 is replaced by a toothed gear 881 which is affixed to drive means 22 by screws 888 and which extends to the periphery 73 of annular flanged portion 74 of drive member 24, and engages a toothed idler gear 883 which is pivotally mounted at rod 885 which extends between apertured disks 887 and 889 which are held in a spaced apart concentric configuration by bars 890. Disk 889 is affixed to drive means 24 by screws 911 and is rotatable therewith. "Gobo", i.e. pattern holders 900 are rotatably seated in apertures 910 and have peripherally extending toothed flange portions 920 which are slidably held between disks 887 and 889. Pattern holder 900D is mechanically interlocked by way of its toothed peripheral portion 920 to toothed idler gear 883 and also to the toothed flanges of adjacent pattern holders as indicated at 930. All of the pattern holders 900 are similarly interlocked with the toothed flanges 920 of adjacent pattern holders. In operation, with the electrically operable motor 64 held in a dynamically stopped position drive means 24 is stationary and under these circumstances, actuation and rotation of the electrically operable motor 62 will cause rotation of drive means 22 which will rotate toothed gear 881 to which it is affixed by screws 888. The rotation of toothed gear 881 will cause idler gear 883 to rotate and spin pattern holders. 900. Actuation of electrically operable motor 64 to rotate drive means 24 will move different pattern apertures 900 into the path of light beam 11, which can be accomplished while the apertures 900 are spinning due to rotation of drive means 22 as above described.

While only certain preferred embodiments of this invention have been described, it is understood that many embodiments thereof are possible without departing from the principles of this invention as defined in the claims that follow.

What is claimed is:

1. Apparatus for positioning media-containing apertures of a rotatable disk assembly for placement to intercept at least a portion of a light beam, said apparatus comprising;
    (a) a base member for supporting a longitudinally extending shaft;
    (b) a longitudinally extending shaft supported by and extending from said base member;
    (c) a plurality of separate disk assembly mounting means having respective concentric mechanically interlockable outer rims for engagement with respective drive means, each said mounting means being supportably mounted on said longitudinally extending shaft and being independently rotatable about the longitudinally extending shaft;
    (d) a plurality of adjacent disk assemblies each having media-containing apertures, said disk assemblies being respectively affixed to a plurality of said mounting means to intercept at least a portion of a light beam; and
    (e) a plurality of electrically operable drive means respectively interlockingly engaged with a plurality of said mechanically interlockable outer rims for independently and synchronously rotating each of said mounting means about said longitudinally extending shaft and for independently and dynamically holding each of said mounting means in a fixed stationary position when the electrically operable drive means interlocked therewith is not moving, so that media-containing apertures of a plurality of said disk assemblies can be concurrently positioned to intercept at least a portion of said light beam.

2. Apparatus in accordance with claim 1, wherein each of said mechanically interlockable outer rims has peripheral gear teeth which engage a separate toothed drive belt which is engaged to a toothed drive shaft of an electrically operable drive means.

3. Apparatus in accordance with claim 1, wherein a first one of said plurality of drive means has a cylindrically shaped axial extension which slide-fits into an axial through-bore of a second of said plurality of drive means and is surrounded by an annular flange of said second of said plurality of drive means, which is coaxial with said cylindrically shaped coaxial extension.

4. Apparatus in accordance with claim 3, wherein one of said plurality of disk assemblies is affixed to said cylindrically shaped extension and another of said disk assemblies is affixed to said annular flange.

5. Apparatus in accordance with claim 4, wherein a third of said plurality of drive means is axially affixed to said longitudinally extending shaft and another of said disk assemblies is affixed to said longitudinally extending shaft.

6. Apparatus in accordance with claim 3, wherein a circular toothed drive gear is coaxially affixed to said cylindrically shaped axial extension and a disk assembly having a toothed idler gear engaged with said drive gear is affixed to said annular flange.

7. Apparatus in accordance with claim 6, wherein said disk assembly has a plurality of circular pattern holders rotatably mounted thereon, each with peripheral gear teeth engaged to another of said pattern holders and one of said pattern holders being engaged with the gear teeth of the idler gear in addition to being engaged with another of said pattern holders.

8. Apparatus in accordance with claim 7, wherein said disk assembly comprises spaced apart plates each with a plurality of opposed circular apertures between at least one or more of which a circular pattern holder is rotatably engaged.

9. Apparatus in accordance with claim 8, wherein said one or more of said circular pattern holders has a peripheral toothed extension which is slidably held between said opposed plates.

10. Apparatus in accordance with claim 1, wherein each of said electrically operable drive means is a separate servo motor which is electrically connected to a remote console for independent actuation of each said motor by electrical signals from which console.

11. Apparatus in accordance with claim 1, wherein said media-containing apertures in at least one of said adjacent disk assemblies are provided with at least a plurality of color filters.

12. Apparatus in accordance with claim 1, wherein said media-containing apertures in at least one of said adjacent disk assemblies are provided with at least a plurality of gobo patterns.

13. Apparatus in accordance with claim 1, wherein said media-containing apertures in said plurality of adjacent disk assemblies are provided with at least a plurality of color filters and at least a plurality of gobo patterns.

14. Apparatus in accordance with claim 1, wherein the number of said plurality of adjacent disk assemblies is three.

15. Apparatus in accordance with claim 1, wherein each of said adjacent disk assemblies is provided with eight media-containing apertures.

* * * * *